United States Patent
Zhu et al.

(10) Patent No.: US 10,440,069 B2
(45) Date of Patent: Oct. 8, 2019

(54) SYSTEM AND METHOD FOR ACQUIRING, PROCESSING, AND UPDATING GLOBAL INFORMATION

(71) Applicant: Alibaba Group Holding Limited, Grand Cayman (KY)

(72) Inventors: Yunfeng Zhu, Hangzhou (CN); Yijun Lu, Hangzhou (CN); Yanchao Li, Hangzhou (CN); Jibin Lei, Hangzhou (CN); Yunfeng Tao, Hangzhou (CN); Zhiyang Tang, Hangzhou (CN); Jun Yu, Hangzhou (CN); Jia Feng, Hangzhou (CN); DongBai Guo, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 185 days.

(21) Appl. No.: 15/386,072

(22) Filed: Dec. 21, 2016

(65) Prior Publication Data
US 2017/0187761 A1    Jun. 29, 2017

(30) Foreign Application Priority Data

Dec. 29, 2015    (CN) .......................... 2015 1 1017566

(51) Int. Cl.
*H04L 29/06*    (2006.01)
*G06Q 30/06*    (2012.01)
(Continued)

(52) U.S. Cl.
CPC ............ *H04L 65/1073* (2013.01); *G06F 8/71* (2013.01); *G06Q 30/0601* (2013.01);
(Continued)

(58) Field of Classification Search
CPC ........................ H04L 65/1073; H04L 61/2503
(Continued)

(56) References Cited

U.S. PATENT DOCUMENTS 5,828,665 A    10/1998    Husak
5,893,117 A     4/1999    Wang
(Continued)

FOREIGN PATENT DOCUMENTS

CN    101043419 A    9/2007
CN    104519130 A    4/2015
(Continued)

OTHER PUBLICATIONS

International Preliminary Report on Patentability to corresponding International Application No. PCT/US2016/06817 dated Jul. 12, 2018 (10 pages).
(Continued)

*Primary Examiner* — Wing F Chan
*Assistant Examiner* — Leon Y Tseng
(74) *Attorney, Agent, or Firm* — James J. DeCarlo; Greenberg Traurig, LLP

(57) ABSTRACT

A system, apparatus, and method for maintaining the consistency of global information is disclosed herein. In one embodiment, the method includes retrieving current version information associated with the global information from a global information server; retrieving global information from the global information server based on the current version information; updating a period of validity of the current version information based on a status of communication with the global information server; and suspending a network service for the global information when detecting that the period of validity of the current version information has expired.

20 Claims, 10 Drawing Sheets

(51) Int. Cl.
*H04L 29/08* (2006.01)
*G06F 8/71* (2018.01)
*H04L 29/12* (2006.01)
*G06F 8/65* (2018.01)

(52) U.S. Cl.
CPC .......... *H04L 65/1076* (2013.01); *H04L 67/34* (2013.01); *G06F 8/65* (2013.01); *H04L 61/2503* (2013.01)

(58) Field of Classification Search
USPC ........................................................ 709/224
See application file for complete search history.

(56) References Cited

U.S. PATENT DOCUMENTS

| | | |
|---|---|---|
| 6,192,398 B1 | 2/2001 | Hunt |
| 6,910,148 B1 | 6/2005 | Ho et al. |
| 6,950,820 B2 | 9/2005 | Bae |
| 7,710,934 B2 | 5/2010 | Cho et al. |
| 7,870,226 B2 | 1/2011 | Anna et al. |
| 7,958,092 B2 | 6/2011 | Werner et al. |
| 8,141,156 B1 | 3/2012 | Mao et al. |
| 8,151,062 B2 | 4/2012 | Krishnaprasad et al. |
| 8,352,634 B2 | 1/2013 | Shen et al. |
| 9,374,310 B2 | 6/2016 | Natarajan et al. |
| 2002/0131075 A1 | 9/2002 | Kremer |
| 2002/0161917 A1 | 10/2002 | Shapiro et al. |
| 2003/0051236 A1 | 3/2003 | Pace et al. |
| 2003/0067924 A1 | 4/2003 | Choe et al. |
| 2004/0205569 A1 | 10/2004 | McCarty et al. |
| 2005/0182498 A1* | 8/2005 | Landou .................. G05B 15/02 700/20 |
| 2005/0265346 A1 | 12/2005 | Ho et al. |
| 2006/0106940 A1 | 5/2006 | Jagannathan et al. |
| 2006/0112176 A1 | 5/2006 | Liu et al. |
| 2006/0136513 A1 | 6/2006 | Ngo et al. |
| 2007/0226269 A1 | 9/2007 | Anna et al. |
| 2008/0021866 A1 | 1/2008 | Hinton et al. |
| 2008/0086737 A1 | 4/2008 | Bae et al. |
| 2008/0259844 A1 | 10/2008 | Richeson et al. |
| 2010/0076831 A1 | 3/2010 | Samuel |
| 2010/0076931 A1 | 3/2010 | Bomhoevd et al. |
| 2010/0235509 A1 | 9/2010 | Xia |
| 2011/0135275 A1 | 6/2011 | Katsuo et al. |
| 2012/0143903 A1 | 6/2012 | Scully et al. |
| 2013/0047122 A1 | 2/2013 | Ijas et al. |
| 2013/0066866 A1 | 3/2013 | Chan et al. |
| 2014/0189484 A1 | 7/2014 | Fountenberry |
| 2014/0280479 A1 | 9/2014 | Kazerani et al. |
| 2015/0347326 A1 | 12/2015 | Pandya et al. |
| 2016/0337264 A1 | 11/2016 | Murashko et al. |

FOREIGN PATENT DOCUMENTS

| | | |
|---|---|---|
| CN | 105282045 A | 1/2016 |
| EP | 3001644 A1 | 3/2016 |
| WO | 2015000359 A1 | 1/2015 |

OTHER PUBLICATIONS

International Search Report and Written Opinion to corresponding International Application No. PCT/US2016/068175 dated Mar. 10, 2017 (11 pages).
International Search Report and Written Opinion to International Application No. PCT/US2016/068177 dated Mar. 10, 2017 (14 pages).
International Search Report and Written Opinion to International Application No. PCT/US2016/068618 dated Mar. 16, 2017 (14 pages).
International Preliminary Report on Patentability to International Application No. PCT/US2016/06818 dated Jul. 12, 2018 (13 pages).
International Preliminary Report on Patentability to International Application No. PCT/US2016/068177 dated Jul. 12, 2018 (14 pages).
Pappas et al., "Improving DNS Service Availability by Using Long TTLs; draft-pappas-dnsop-long-ttl-02.txt," Internet Engineering Task Force, No. 2, pp. 1-22 (2006).
Extended European Search Report to corresponding European Application No. 16882401.9 dated Jul. 16, 2019, 9 pages.

* cited by examiner

SYSTEM AND METHOD FOR ACQUIRING, PROCESSING, AND UPDATING GLOBAL INFORMATION

CROSS-REFERENCE TO RELATED APPLICATIONS

This application claims the benefit of priority from Chinese Patent Application No. 201511017566.6, filed on Dec. 29, 2015 entitled, "Method and Apparatus for Global Information Acquisition and Processing and System for Updating of Same," which is incorporated herein by reference in its entirety.

BACKGROUND

Field of the Disclosure

The present disclosure relates to the field of the Internet technologies, and in particular, to systems, devices, and methods for acquiring, processing, and updating global information.

Description of the Related Art

With the rapid development of e-commerce globalization, cross-regional e-commerce transactions are becoming increasingly popular and frequent. A business deployed in a large-scale cross-regional distributed e-commerce environment often faces global information update demands. In order to provide continuous services, the update process must be efficient and data must be consistent.

Consider, as examples, IP address translation configuration data in a virtual private cloud (VPC) business or global information of international e-commerce platforms, such as eBay, Amazon, etc. By using a routing table, user data operations at a data center may be grouped geographically in the e-commerce trade process. To quickly respond to a user's data operation requests, and guarantee consistency of global information, international e-commerce platforms usually distribute a plurality of data centers in multiple regions. These platforms generally assign the nearest data centers to users based to the users' location and record these assignments in a routing table. Subsequently, a user's data operation requests are served based on the routing table (i.e., at an assigned data center). Thus the platforms are not only able to efficiently serve users in various regions, but are also able to guarantee that all data operations by the same user occur at the same data center.

In practice, however, users may perform cross-regional data operations. For example, users may travel to other cities or immigrate to other countries. To quickly respond to a user's data operation requests and guarantee global data consistency, the data centers, in which users belong to, need to be reassigned and the routing table needs to be updated.

Current techniques to update a routing table generally include the following steps. First, a management control system (MCS) of an e-commerce platform pushes an updated version of the routing table to the application servers in the various regions. Next, the application servers return update confirmation notices to the MCS after receiving the new version of the routing table and then suspend service of the users' data operation requests. The MCS then sends enabling instructions for the new routing table to the application servers after confirming that all the application servers in the various regions have received the new version of the routing table. Finally, the application servers restore normal services after receiving the enabling instructions, so that the application servers in the various areas can use the unified routing table to serve the users.

However, in a large-scale cross-regional routing table update scenario, because of service network abnormities, faults in the application servers, and other causes, some application servers may not receive the new version of the routing table. On one hand, the application servers missing the routing table update will continuously provide service via the old routing table after resuming normal work, causing the application servers to not utilize the unified routing table and resulting in inconsistencies in the global information. On the other hand, failed application servers may disappear from an update list in the MCS of the e-commerce platform. The update statuses of these application servers, which are not updated, cannot be sent to the MCS. Thus, the MCS cannot determine the update statuses of the routing table in use by the application servers from the update list. Therefore, accurate global synchronous status information cannot be guaranteed. In addition, global data inconsistency and inaccurate global synchronous status information may occur in the large-scale cross-regional update scenario.

BRIEF SUMMARY

In view of the problems above, the embodiments of the disclosure provide methods, systems, and devices for acquiring, processing, and updating global information, which can solve or at least partially solve the problems above.

According to one embodiment, the disclosure describes a method for maintaining the consistency of global information. The method includes retrieving, by the server, current version information associated with current global information and associated with a network service from a global information server; retrieving, by the server, current global information associated with a network service from the global information server based on the current version information; updating, by the server, a period of validity of the current version information based on a status of communication with the global information server; and suspending, by the server, the network service associated with the current global information when detecting that the period of validity of the current version information has expired.

According to one embodiment, the disclosure describes an apparatus for maintaining the consistency of global information. The apparatus includes a processor and a non-transitory memory storing computer-executable instructions therein. The instructions, when executed by the processor, cause the apparatus to: retrieve current version information associated with current global information and associated with a network service from a global information server; retrieve current global information associated with a network service from the global information server based on the current version information; update a period of validity of the current version information based on a status of communication with the global information server; and suspend the network service associated with the current global information when detecting that the period of validity of the current version information has expired.

According to one embodiment, the disclosure describes a system for maintaining the consistency of global information. The system includes a global information server configured to store current version information and global information; a global information update management control device configured to transmit current version information and global information to the global information server; and an application server configured to: retrieve the current version information associated with the current global information and associated with a network service from the global information server; retrieve current global information associated with a network service from the global information server based on the current version information; update a period of validity of the current version information based on a status of communication with the global information server; and suspend the network service associated with the current global information when detecting that the period of validity of the current version information has expired.

The embodiments of the disclosure have the following advantages.

According to the embodiments of the disclosure, the validity of historical version information is updated according to communication statuses of application servers and global information servers, a service of the application servers is suspended in the condition of abnormal communication statuses, so that the problem that global data of the application servers is inconsistent, which is caused by network abnormities or "apparent death" of an update process or other causes, can be solved.

In addition, by confirming the communication statuses of the application servers and the global information servers, the global information update management control device can accurately acquire the global synchronous status information.

DETAILED DESCRIPTION

The purposes, characteristics and advantages of the disclosure are more further explained in detail with respect to the Figures and related descriptions herein.

Figure 1:
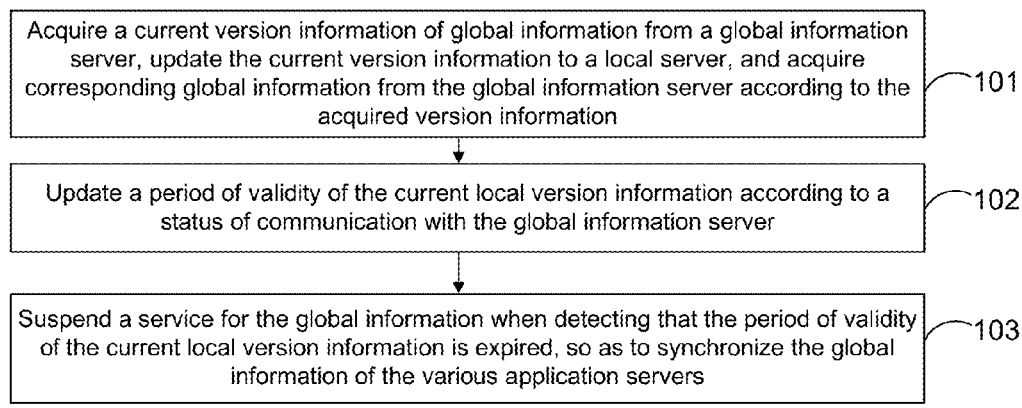
FIG. 1 is a flow diagram illustrating a method for acquiring global information according to some embodiments of the disclosure.

FIG. 1 is a flow diagram illustrating a method for acquiring global information, according to some embodiments of the disclosure.

In step 101, the method acquires current version information of global information from a global information server, updates the current version information at a local server, and acquires corresponding global information from the global information server according to the acquired version information.

In one embodiment, global information may comprise configuration data for IP address translation in a VPC business or a global routing table or any data requiring global updates. Those skilled in the art can utilize global information in multiple global information update scenarios according to actual demands and the core concepts provided in the disclosure.

The global information update system of an e-commerce platform can comprise a global information update management control device, global information servers, and application servers.

The global information update management control device is responsible for coordinating an update process of the global information. Specifically, the global information update management control device actively pushes the updated global information and the corresponding version information to the global information servers in multiple regions, or correspondingly modifies the version information of the global information servers after pushing the updated global information to the global information servers in multiple regions. It should be noted that because the process of transmitting the global information with a large amount of data takes a very long time, the global information update management control device may only push the global information to the global information servers, and may not trigger the update of the global information. The global information update management control device can trigger the global information update after pushing the version information with a small amount of data to the global information servers. In actual applications, the global information update management control device can be an MCS.

A global information server may comprise a global information cache server on which the global information is saved and a version information management server on which the version information is saved.

In one embodiment, the global information servers can be deployed in regions in which the application servers belong to. In some embodiments, the global information server can be separately provided with a global information cache system and a version information management system. The global information cache system is capable of caching the global information of various versions pushed by the global information update management control device. The version information management system is capable of caching version information of various versions of global information pushed by the global information update management control device, or receiving modifications of the version information saved by the global information update management control device. In addition, the version information management system is further responsible for coordinating the update processes of the version information of the global information of the various application servers in the region, so as to maintain data consistency of the global information.

Certainly, those skilled in the art can separately implement the global information cache system and the version information management system on two servers, namely a global information cache server and a version information management server, respectively deployed in each region. The global information cache server is responsible for caching the global information pushed by the global information update management control device, and the version information management server is responsible for saving the version information of various versions of global information and coordinating the update processes of the version information of the application servers in the region. In some embodiments, since the global information contains a large amount of data and requires a long transmission time, the global information can be pushed to the global information cache server in advance. After the global information is completely pushed, the update of the version information recorded by the various application servers in the region is triggered by the version information management server, so as to separate the global information from the version information.

The application servers can be the application servers corresponding to various applications on an e-commerce platform. An application server can detect the new version information pushed to the global information servers by the global information update management control device or the modifications of the version information from the version information management system of the global information servers in the region by way of subscribing to new version information of the global information, and can acquire the new version information of the global information from the global information servers.

In one embodiment, the application servers acquire the current version information of global information from a global information server, and acquire the corresponding global information from the global information server according to the acquired version information. In other embodiments, the global information of a complete new version may be acquired, or only partial updated global information may be acquired.

In some embodiments, historical version information recorded in the local application servers can be updated according to the version information acquired from the global information server(s). The application servers may acquire the global information corresponding to the version information from the global information servers according to self-updated version information, so as to acquire updated global information. After the update, an update confirmation notice can be returned to the global information servers so that the global information servers may conveniently collect the update confirmation notice and return the update confirmation notice to the global information update management control device.

In contrast to existing techniques that require current application servers to acquire a complete set of global information with a large amount of data and correspondingly return an update confirmation notice, the application servers described herein can immediately return an update confirmation notice after acquiring version information with a small amount of data and acquire the corresponding global information from the global information servers according to the updated version information. The global information servers independently receive various versions of global information pushed by the global information update management control device. By way of decoupling the update process of the global information and the version information, although differences exist among network links, physical distances and other conditions, the differences in the time consumed by the application servers to acquire the version information are relatively small; therefore, the global version information can be updated within a short period of time.

In one embodiment, the version information includes transitional version information, the global information includes transitional global information, and the step of acquiring corresponding global information from the global information server according to the acquired version information may include acquiring the corresponding transitional global information from the global information server according to the acquired transitional version information. In another embodiment, acquiring global information may further include determining whether the acquired transitional global information includes a stop-write identification and, if so, suspending the service associated with the transitional global information, and if not, providing the service associated with the transitional global information.

It should be noted that in a global information update system of an e-commerce platform, because of the differences among network links, physical distances, and other conditions between the various application servers in the region and the global information servers, some application servers may have already received the new version information, while other application servers are still in the process of receiving the new version information. Even ideal external conditions do not guarantee that all application servers can receive the new version information at the same time. If the application servers provide a service using different versions of global information, the global data may be inconsistent. To guarantee global data consistency, unified global information must be used globally; therefore, some application servers acquiring the new version information must be placed in a "waiting" state, and cannot continuously serve users, thus affecting the user experience of e-commerce platforms. Therefore, using current techniques, the update efficiency of a current global information update method is low and the global data consistency and service efficiency cannot be guaranteed at the same time.

In practice, not all the global information is updated, so a service associated with the updated global information can be suspended, and the remaining global information can be used to continuously serve users.

In the process of updating a historical version of global information to a new version of the global information, before the global information update management control device sends the new version of the global information (and the corresponding version information), the global information update management control device can add a stop-write identification for global information that has or will be changed, and generate transitional global information and corresponding transitional version information. The stop-write identification is used for suspending a service relevant to certain transitional global information.

The global information update management control device can push the transitional version of the global information and the corresponding transitional version information to the global information server. The application servers can acquire the transitional version information of the global information from the global information server via subscription.

Therefore, a piece of transitional version information is inserted in the process of updating the historical version of the global information to the new version of the global information. When the global information of the whole system is updated, the historical version of the global information is first updated to the transitional version information, and then the transitional version information is updated to the new version of the global information.

The application servers can acquire the corresponding transitional global information from the global information server according to the transitional version information. In actual applications, the application servers can acquire a piece of complete transitional global information, or only acquire currently required transitional global information.

For the acquired transitional global information, the application servers can determine whether the transitional global information includes a stop-write identification. If certain transitional global information includes a stop-write identification, the service associated with the transitional global information can be suspended, and if not, the service associated with the transitional global information can be provided. The transitional global information may include a the stop-write identification, which indicates that the global information has been changed or will be changed. If, for example, a service modifying relevant data on an Internet data center is provided according to the historical global information, the data modification may be in conflict with other unfinished global information and the data modified via the historical global information, thus global data will be inconsistent. Therefore, the service associated with the transitional global information needs to be suspended to guarantee global data consistency. But global information without a stop-write identification indicates that the global information is not changed. If a service is then provided using the global information, problems with inconsistent global data do not occur, so the corresponding service can be continuously provided via the global information.

Therefore, during the process of updating the global information, though the historical version information and the transitional version information, or the transitional version information and the new version information exist on the global application servers at the same time, global data consistency is not affected. The affected user service is only limited to a user service associated with partial global information which includes the stop-write identification in the updated global information of the transitional version.

By inserting the global information of the transitional version in the process of updating the historical version of the global information to the new version of the global information, the application servers can acquire the global information according to the transitional version information and need to suspend a partial service only when acquiring the global information including the stop-write identification. Thus, the unavailable service time of the global system is greatly shortened, solving the problem that the service of the global system is unavailable for a long time during updating. Thus, by guaranteeing global data consistency, the service continuity of e-commerce platforms is improved, influence on users when the global information is updated is reduced, and the problem that a user service needs to be completely suspended for a long time in the process of updating the global information and user experience is influenced can be avoided.

In step 102, the method updates a period of validity of the current version information according to the status of communication with the global information server.

In step 103, the method suspends a service associated with the global information when detecting that the period of validity of the current version information has expired, so as to synchronize the global information of the various application servers.

In some embodiments, because of network abnormalities of a large amount of application servers of cross-regional e-commerce platforms or the "apparent death" of the update process and other causes, when the global information update management control device confirms the update status of the version information of the application servers via the global information servers, some application servers may actually be omitted, and the global information update management control device may then mistakenly assume that all the application servers have acquired the updated version information.

For example, after updating the local historical version information, the application servers write their own update confirmation information and enter it into a global information update confirmation directory of the version information management system of the global information servers in the region. The global information update management control device can read the update confirmation information on the directory by way of subscribing to the global information update confirmation directory when receiving a change notice, and confirm the current global information update statuses. But some application servers may disappear from a live application server list in the global information servers because of network abnormities of the servers or the "apparent death" of their own processes. Thus, the update statuses of the application servers requested by the global information update management control device via the global information servers may not be the total number of application servers.

Abnormal application servers may return to normal after some time, but may miss the global information update and continuously provide the service via outdated global information. Viewed from the point of the e-commerce platform system as a whole, the application servers returning to normal provide the service via the outdated version of global information, but the normally-updated application servers provide the service via the updated versions of global information. Ultimately, the inconsistency of global data is caused by servers providing global information of different versions.

To solve the problems of current techniques, embodiments of the disclosure provide a validity-based distributed coordination management mechanism of the global information and the version information, so that the abnormal application servers can actively know that the locally-maintained version information and the global information have expired, and do not provide the service via the expired global information, thus guaranteeing global data consistency. At the same time, the global information update management control device can accurately synchronize the update statuses of the global information implemented by all of the application servers.

A period of validity can be configured for the version information, and the validity of the current version information is updated according to the statuses of communication with the global information server. Specifically, the statuses of communication with the application servers and the global information servers can be confirmed in advance. If the communication statuses are normal, the validity of the historical version information being used can be reset, and the historical version information can be normally used to serve users within the period of validity. If the communication statuses are abnormal (for example, if the application servers cannot be accessed to the global information servers within a period of time), it may be determined that the historical version information has expired, because the new version of the global information may be updated within this time period. If the historical version information is continuously used to serve users, the global data may be inconsistent, so that the historical version information does not need be used to serve users.

On the other hand, the global information servers can determine the abnormalities of some application servers according to the communication status with the application server, so as to remove the abnormal application server from the live application server list. When requesting the live application server list, the global information update management control device compares the live application server list with all preset application server lists on the global information servers. If the two lists match, the global information of the application servers in the regions (in which the global information servers belong to) is updated completely, so as to accurately synchronize the update statuses of the global information implemented by all application servers.

Those skilled in the art can confirm the communication statuses in multiple ways, for example, by sending heartbeat packets. Those skilled in the art also can configure the validity of the version information according to actual situations, for example, by the application servers and the global information servers automatically negotiating to determine the validity.

According to some embodiments, by updating the validity of the historical version information according to the communication statuses of the application servers and the global information servers, the service of the application servers is suspended in the condition of abnormal communication statuses, so that the problem that global data of the application servers is inconsistent, which is caused by network abnormities or "apparent death" of an update process or other causes, can be solved.

In addition, by confirming the communication statuses of the application servers and the global information servers, the global information update management control device can accurately acquire the global synchronous status information.

Figure 2:
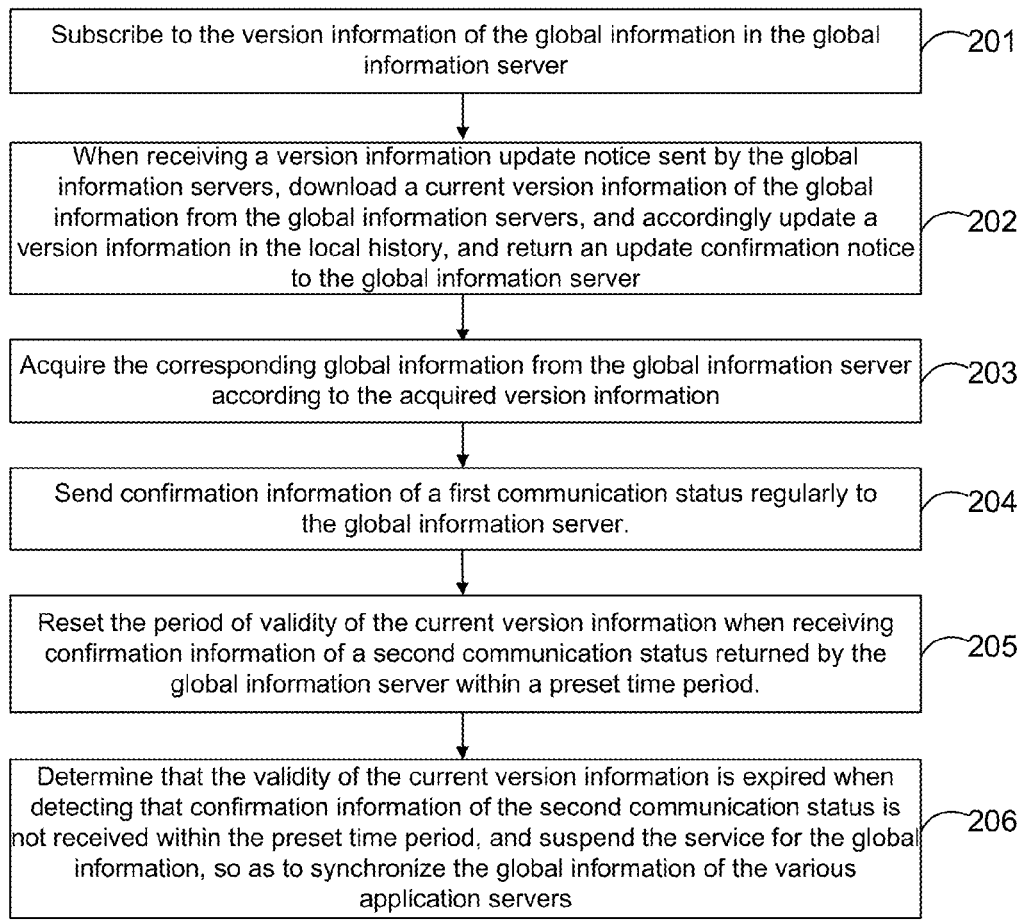
FIG. 2 is a flow diagram illustrating a method for acquiring global information according to some embodiments of the disclosure.

FIG. 2 is a flow diagram illustrating a method for acquiring global information according to some embodiments of the disclosure. In some embodiments, the method illustrated in FIG. 2 may be performed at an application server.

In step 201, the method subscribes to the version information of the global information in the global information server In step 202, when receiving a version information update notice sent by the global information servers, the method downloads current version information of the global information from the global information servers, and accordingly updates version information in the local history, and returns an update confirmation notice to the global information server.

The application servers can detect the new version information pushed to the global information servers by a global information update management control device or the modifications of the version information from a version information management system of the global information servers in the region by way of subscribing to the new version information of the global information. When acquiring the new version of the global information and the corresponding version information, the global information servers can send the version information update notice to the application servers, and the application servers can acquire the new version information by way of pushing by the global information servers or downloading by the application servers. The application servers can update the local historical version information via the acquired version information, and return an update confirmation notice to the global information servers. In actual applications, the application servers can write their own update confirmation information and enter it into a global information update confirmation directory of a version information management system of the global information servers in the region.

The application servers can timely acquire the global information to be updated by way of the application servers subscribing to the global information servers, so that the update efficiency of the global information is improved.

In step 203, the method acquires the corresponding global information from the global information server according to the acquired version information.

In step 204, the method sends confirmation information of a first communication status regularly to the global information server.

In step 205, the method resets the period of validity of the current version information when receiving confirmation information of a second communication status returned by the global information server within a preset time period.

In step 206, the method determines that the validity of the current version information has expired when detecting that confirmation information of the second communication status is not received within the preset time period, and suspends the service for the global information, so as to synchronize the global information of the various application servers.

In one embodiment, the application servers can regularly send the first communication status confirmation information to the global information server. If the communication statuses are normal, the global information server can receive the first communication status confirmation information within the preset time period and correspondingly return the second communication status confirmation information. If the application servers receive the second communication status confirmation information, it means that the current statuses of communication with the global information server are normal, the validity of the version information of the currently used global information can be reset, and user's service acquisition requests can be processed via the version information.

If the application servers do not receive the second communication status confirmation information returned by the global information servers, it means that communication with the global information server is abnormal and the version information of the global information may need to be updated within the time period. Based on this uncertainty, the application servers can determine that the current version information has expired and should not be used for serving users to guarantee global data consistency.

In alternative embodiments, the method may further comprise registering a monitoring session of a communication status to the global information server, and timing the period of validity of the current version information after a successful registration.

In some embodiments, prior to the step of determining if the period of validity of the current version information has expired, the method may further comprise re-registering the monitoring session of the communication status to the global information server, and determining that the period of validity of the current version information has expired if the registration fails.

The application servers can register a communication status monitoring session with the global information server. When registering the communication status monitoring session, the application servers can specify a client session timeout (CST). The global information server will calculate a corresponding server session timeout and determine whether the validity of the version information has expired according to the client session timeout and the server session timeout. After a successful registration, the validity of the current version information can be calculated. Prior to determining the validity of the current version information to be expired, the monitoring session of the communication status can be re-registered with the global information server. If the registration fails, the current version information is determined to be expired.

To be easily understood, one embodiment of the validity-based distributed coordination management mechanism of the global information and the version information is explained in detail below.

The application servers may be considered the client of the distributed coordination management mechanism of the global information and the version information, and the global information server can be considered the server. The validity of the connection statuses between the client and the server is achieved using a session. When the client registers the session with the server, a client session timeout needs to be specified, and the server will calculate a corresponding server session timeout according to the client session timeout. The client and the server mutually confirm the effectiveness of the session via a heartbeat. If one side does not receive the heartbeat response of the other side within the session timeout, the session has expired.

The session timeout negotiated by the client and the server can guarantee that the server can determine a certain session has expired according to the server session timeout. Correspondingly, the client can determine whether a certain session has expired in advance according to their own client session timeout (CST).

Figure 7:
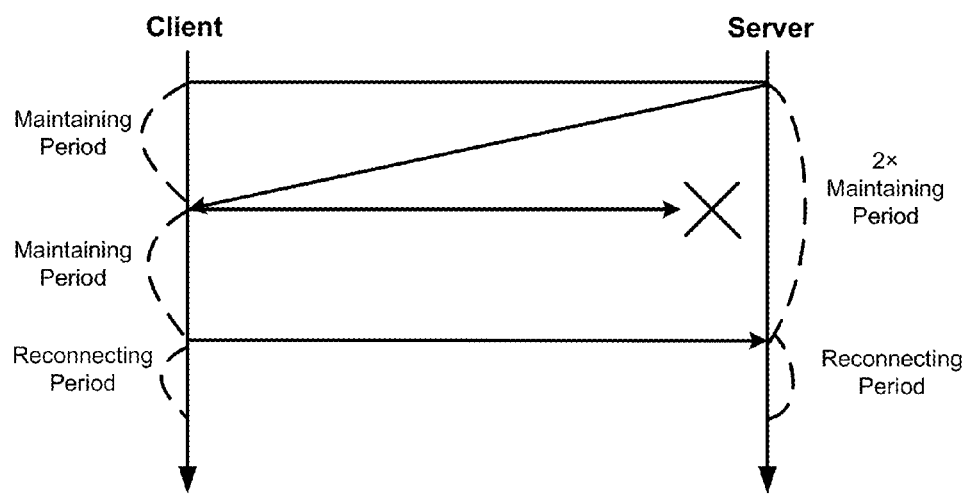
FIG. 7 is a diagram illustrating a session timeout procedure according to some embodiments of the disclosure.

FIG. 7 is a diagram illustrating a session timeout procedure according to some embodiments of the disclosure.

The session timeout of the client is broken down into an MP (maintaining period) for determining that the session is normal and an RP (reconnecting period) for reconnecting to the server after finding that the connection is abnormal. In a non-ideal condition, if the server immediately receives a heartbeat packet sent by the client, but does not receive the heartbeat packet response after the second MP ends, it is determined that the connection state between the client and the server is abnormal, and the client enters the RP stage to reconnect to other servers, and additionally, determines that the session has expired. A server still waiting for a heartbeat packet needs to determine that the session has expired. Therefore, the client session timeout can be set to MP+RP, but the server session timeout is set to MP×2+RP or CST×2 at least, thus the negotiated session timeout can guarantee that the expired session judgment of the client and the server can maintain consistency.

For the distributed coordination management mechanism of the global information and the version information, each application server can determine the client session timeout based on the lease value representative for the validity of associated data, and register the session with the global information servers of the region.

Figure 8:
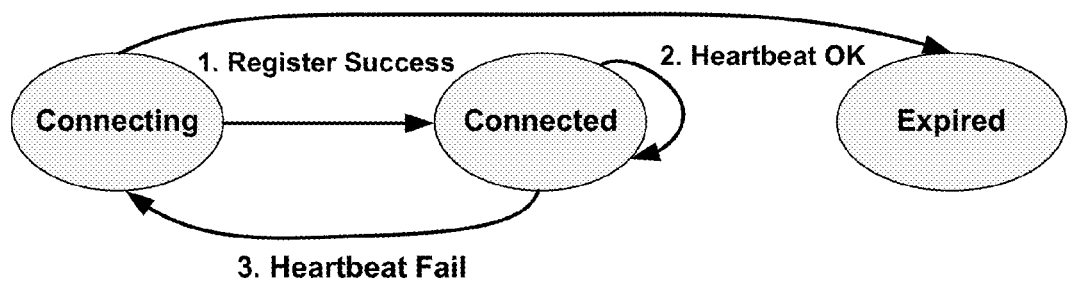
FIG. 8 is a flow diagram illustrating a method for registering a session according to some embodiments of the disclosure.

FIG. 8 is a flow diagram illustrating a method for registering a session according to some embodiments of the disclosure.

The application servers enter the connected state after successfully registering the session, and lease validity associated with the version information of the local global information is initiated. Then, the application servers regularly and mutually confirm the heartbeat with the version information management system of the global information servers of the region, and reset the lease validity corresponding to the local version information according to the heartbeat response. If the heartbeat response is not received, the application servers re-enter the connecting state, and try to re-register the session. If the application servers fail to register within the client session timeout, it is determined that the session has expired, namely the lease validity corresponding to the version information of the local global information has expired. Operations relevant to the version information are then refused, so as to maintain global data consistency.

It should be noted that if the application servers remain in communication with the global information server, it would allow the application servers to suspend the service when the global information has expired, and more importantly synchronize the global statuses. As illustrated in the embodiments of the distributed coordination management mechanism of the global information and the version information, the application servers and the global information server will maintain the validity of the historical version information on the application servers. For example, according to the session timeout negotiated by the application servers and the global information servers, the MP and the RP are respectively 20 seconds and 10 seconds. If the heartbeat response of the global information servers is not received within 30 seconds (MP+RP), the application servers determine that the self-maintained historical version information has expired. In this case, if the heartbeat confirmation of the application servers is not received within 50 seconds (2×MP+RP), the global information servers determine that the application servers are expired, and mark them as expired application servers on the update list of the application servers. Therefore, based on the heartbeat confirmation and the heartbeat response of both sides, the application servers and the global information servers will maintain the validity of the historical version information, so as to comply with the principle that the application servers can know they have expired in advance while the global information servers determine that a certain application server has expired. In actual usage, users can understand the update statuses of the current global information from the global information servers, so as to guarantee that the global statuses of the update process are the same.

Figure 3:
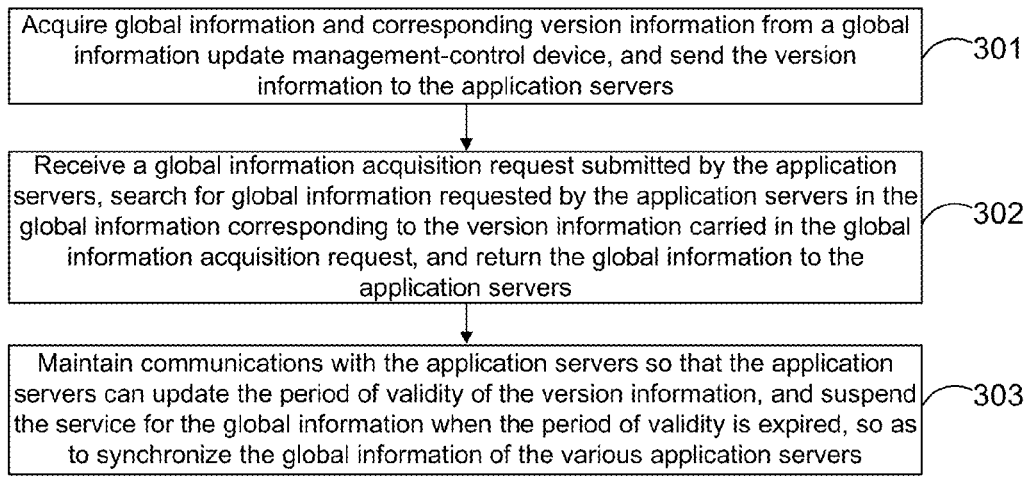
FIG. 3 is a flow diagram illustrating a method for processing global information according to some embodiments of the disclosure.

FIG. 3 is a flow diagram illustrating a method for processing global information according to some embodiments of the disclosure. In some embodiments, the method illustrated in FIG. 3 may be performed by a global information server.

In step 301, the method acquires global information and corresponding version information from a global information update management-control device, and sends the version information to the application servers.

In the embodiment of a global information update system of e-commerce platforms, the global information servers acquire the new version of the global information and the corresponding version information from the global information update management control device.

In actual applications, the global information servers can be separately provided with a global information cache system and a version information management system. The global information cache system can save the global information of the historical version, the transitional version, the new version, and other versions. The version information management system can save the version information of global information of the historical version, the transitional version, the new version and other versions acquired from the global information update management control device, or receive the modifications of the version information saved by the global information update management control device. The global information servers can generate corresponding version information according to the acquired global information. In actual applications, those skilled in the art can implement the global information cache system and the version information management system on two servers, namely the distributed cache server and the distributed coordination server. The distributed cache server is responsible for caching the global information pushed by the global information update management control device, and the distributed coordination server is responsible for coordinating the version information update process of the global information of the various application servers in the regions.

The global information servers can send, according to the situation, the version information of the transitional version or the new version of the global information to multiple application servers in the region.

In step 302, the method receives a global information acquisition request submitted by the application servers, searches for global information requested by the application servers in the global information corresponding to the version information carried in the global information acquisition request, and returns the global information to the application servers.

The application servers can submit, according to their own needs, a global information acquisition request including the current version information to the global information servers. After receiving the global information acquisition request, the global information servers can request the global information of the corresponding version according to the version information that is included in the request, and return the found global information to the application servers.

When the global information is a routing table, after receiving service acquisition requests submitted by users, the application servers can extract user identifications from the service acquisition requests, then generate a routing data acquisition request according to the updated version information, and then send the routing data acquisition request to the global information servers. The global information servers can request the global information of the corresponding version according to the version information therein, and inquire for routing data corresponding to the user identifications in the global information, and then return the found routing data to the application servers so that the application servers can access a corresponding Internet data center.

In one embodiment, by decoupling the global information and the version information of the global information, the global information servers can meet service demands of users by sending the version information to the application servers, inquiring for the corresponding routing data from the global information according to the version information and returning the routing data. Therefore, although network links, physical distances and other differences exist, the differences in the time consumed by the application servers to acquire the version information are relatively small, thus the global version information can be updated within a short period of time, the update efficiency of the global information is improved, and the problem that the service of the global system is unavailable for a long time when updating is solved.

In step 303, the method maintains communications with the application servers so that the application servers can update the period of validity of the version information, and suspend the service for the global information when the period of validity has expired, so as to synchronize the global information of the various application servers.

A period of validity can be configured for the version information, and the validity of the current version information is updated according to the statuses of communication with the global information server. Specifically, the statuses of communication with the application servers can be confirmed in advance. If the communication statuses are normal, the validity of the historical version information being used can be reset by the application servers, and the historical version information can be normally used to serve users within the period of validity. If the communication statuses are abnormal (for example, if the application servers cannot be accessed to the global information servers within a period of time), it is determined that the historical version information has expired, because the new version of the global information may be updated within this time period. If the historical version information is continuously used to serve users, the global data may be inconsistent, so that the historical version information may not be used to serve users.

In one embodiment, the step of maintaining communications with the application servers comprises receiving confirmation information of a first communication status sent by the application servers, and correspondingly returning confirmation information of a second communication status to the application servers.

In specific embodiment, the application servers can regularly send the first communication status confirmation information to the global information server. If the communication statuses are normal, the global information server can receive the first communication status confirmation information within the preset time period and correspondingly return the second communication status confirmation information. If the application servers receive the second communication status confirmation information, it means that the current statuses of communication with the global information servers are normal, the validity of the version information of the currently used global information can be reset, and the service acquisition requests of the users can be processed via the version information.

In one embodiment, the method can further comprise correspondingly updating local live application server information according to the statuses of communication with the application servers, so that the global information update management-control device may search for the update statuses of the global information implemented by the application servers.

The global information servers can determine the abnormalities of certain application servers according to the statuses of communication with the application server, so as to remove the abnormal application server from the live application server list. When inquiring for the live application server list, the global information update management control device compares the live application server list with all preset application server lists on the global information servers; if the two lists are matched with each other, the global information of the application servers, in the region in which the global information servers belong to, is updated completely, so as to accurately synchronize the update statuses of the global information implemented by all application servers.

In one embodiment, by updating the validity of the historical version information according to the communication statuses of the application servers and the global information servers, the service of the application servers is suspended in the event of abnormal communication statuses, so that the problem that global data of the application servers is inconsistent, which is caused by network abnormalities or "apparent death" of an update process or other causes, can be solved.

In addition, by confirming the communication statuses of the application servers and the global information servers, the global information update management control device can accurately acquire the global synchronous status information.

Figure 6:
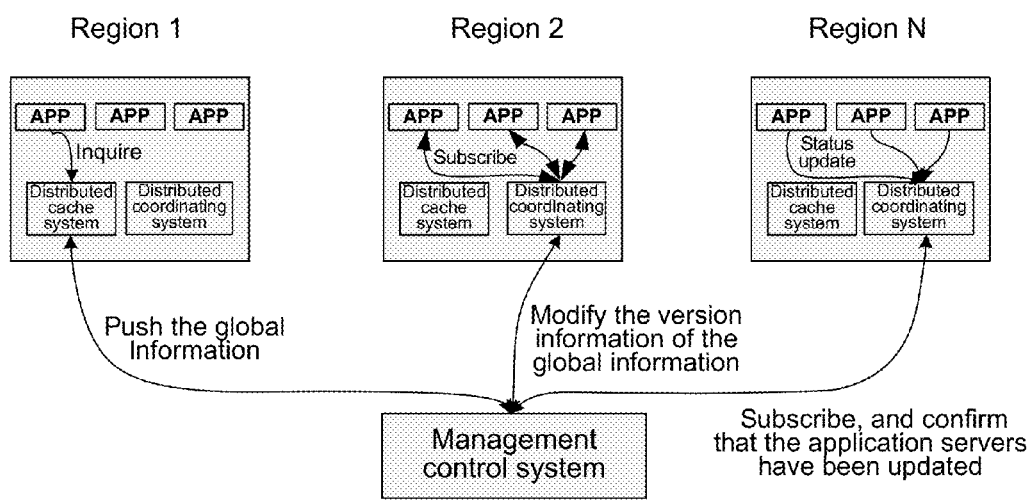
FIG. 6 is a flow diagram illustrating a method for updating global information according to some embodiments of the disclosure.

FIG. 6 is a flow diagram illustrating a method of updating global information, according to some embodiments of the disclosure.

As illustrated in FIG. 6, a cross-regional e-commerce platform can be provided with a MCS responsible for coordinating the update processes of the global information in multiple regions. A global information server containing a global information cache system and a version information management system can be arranged in each region, and each global information server is responsible for updating the version information of multiple application servers and processing the routing data acquisition requests. The MCS pushes the new version of global information to the global information cache system of the global information servers and modifies the version information of the global information of the version information management system. The application servers detect the modifications of the version information by the MCS by way of subscribing to the version information in the version information management system of the global information servers. After updating their own version information, the application servers return an update confirmation notice to the version information management system of the global information servers. The MCS confirms that the version information of the application servers has been updated by way of subscribing to the version information management system.

It should be noted that in order to simply describe the embodiment of the method, the embodiment is described as a series of operation combinations, but those skilled in the art shall know that the embodiments of the disclosures are not limited to the described operation sequence, because some steps can be carried out according to other sequences or implemented at the same time according to the embodiments of the disclosure.

Figure 4:
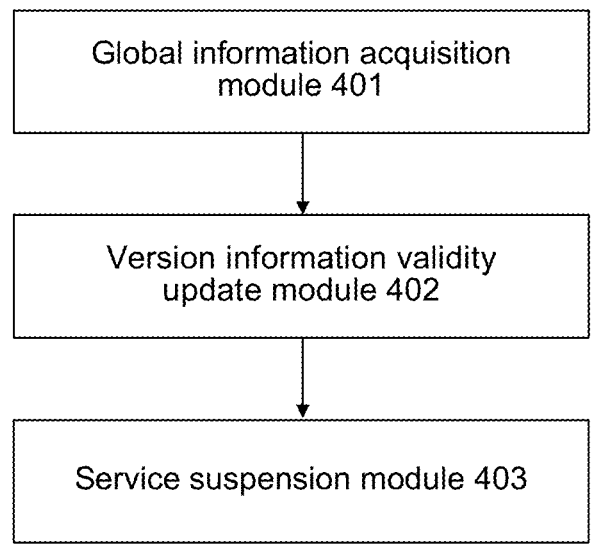
FIG. 4 is a diagram of a device for acquiring global information according to some embodiments of the disclosure.

FIG. 4 is a diagram of a device for acquiring global information according to some embodiments of the disclosure. In some embodiments, the device may be implemented on or as an application server. As illustrated in FIG. 4, the device includes a global information acquisition module 401, a version information validity update module 402, and a service suspension module 403.

The global information acquisition module 401 is configured to acquire a current version information of global information from a global information server, update the current version information in a local server, and acquire corresponding global information from the global information server according to the acquired version information.

The version information validity update module 402 is configured to update a period of validity of the current version information according to a status of communication with the global information server;

The service suspension module 403 is configured to suspend a service for the global information when detecting that the period of validity of the current version information has expired, so as to synchronize the global information of the various application servers.

In one embodiment, the version information validity update module 402 can further include a confirmation information sending submodule for a first communication status configured to send confirmation information of a first communication status regularly to the global information server and a validity reset submodule configured to reset the period of validity of the current version information when receiving confirmation information of a second communication status returned by the global information servers within a preset time period.

In one embodiment, the service suspension module 403 can further include a validity expiry determining submodule configured to determine that the validity of the current version information has expired when detecting that confirmation information of the second communication status is not received within the preset time period, and suspending the service for the global information.

In one embodiment, the device can further include: a monitoring session registering module for communication statuses configured to register a monitoring session of a communication status to the global information server, and time the period of validity of the current version information after a successful registration. In one embodiment, the device can further include a re-registering module configured to re-register the monitoring session of the communication status to the global information server, and determine that the period of validity of the current version information has expired if the registration fails.

As discussed previously, the version information may include transitional version information and the global information may include transitional global information. In some embodiments, the global information acquisition module may further include an acquisition submodule for transitional global information configured to acquire the corresponding transitional global information from the global information server according to the acquired transitional version information.

In alternative embodiments, the device illustrated in FIG. 4 can further include a stop-write identification determining module configured to determine whether the acquired transitional global information includes a stop-write identification and, if so, suspend the service associated with the transitional global information, and if not, provide the service associated with the transitional global information.

In one embodiment, the device illustrated in FIG. 4 can further include an update confirmation notice returning module configured to return an update confirmation notice to the global information server.

In one embodiment, the global information server can be deployed in the region of the application servers. The global information server may comprise a global information cache server storing the global information and a version information management server storing the version information.

In one embodiment, the device illustrated in FIG. 4 can further include a version information subscribing module configured to subscribe to the version information of the global information in the global information server.

In one embodiment, the global information acquisition module may further include an information update submodule for version histories configured to download a current version information of the global information from the global information server when receiving a version information update notice sent by the global information server, and accordingly update a version information in the local history.

In some embodiments, by updating the validity of the historical version information according to the communication statuses of the application servers and the global information servers, the service of the application servers is suspended in the condition of abnormal communication statuses, so that the problem that global data of the application servers is inconsistent, which is caused by network abnormities or "apparent death" of an update process or other causes, can be solved.

In addition, by confirming the communication statuses of the application servers and the global information servers, the global information update management control device can accurately acquire the global synchronous status information.

Figure 5:
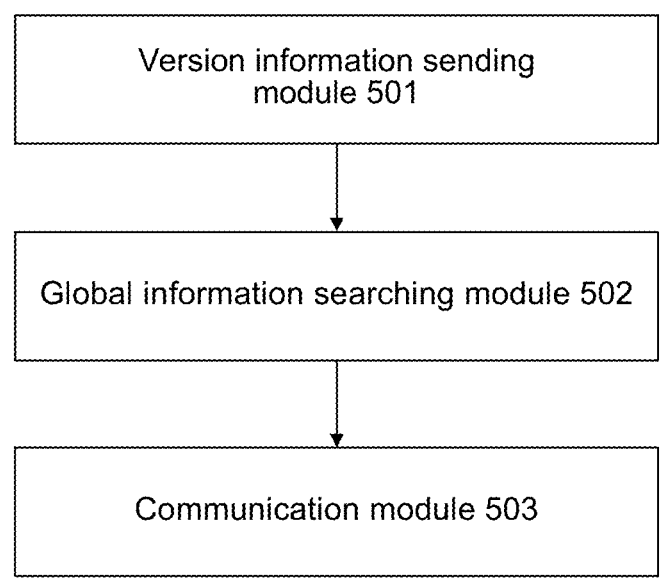
FIG. 5 is a diagram of a device for processing global information according to some embodiments of the disclosure.

FIG. 5 is a diagram of a device for processing global information according to some embodiments of the disclosure. In some embodiments, the device may be implemented on or as an application server. As illustrated in FIG. 5, the device includes a version information sending module 501, a global information searching module 502, and a communication module 503.

The version information sending module 501 is configured to acquire global information and corresponding version information from a global information update management-control device, and send the version information to the application servers;

The global information searching module 502 is configured to receive a global information acquisition request submitted by the application servers, search for global information requested by the application servers in the global information corresponding to the version information included in the global information acquisition request, and return the global information to the application servers;

The communication module 503 is configured to maintain communications with the application servers so that the application servers can update the period of validity of the version information, and suspend the service for the global information when the period of validity has expired, so as to synchronize the global information of the various application servers.

In one embodiment, the communications module 503 may further include a confirmation information interacting submodule for communication statuses configured to receive confirmation information of a first communication status sent by the application servers, and correspondingly return confirmation information of a second communication status to the application servers.

In one embodiment, the device may further include an update module for live application server information configured to correspondingly update local live application server information according to the statuses of communication with the application servers, so that the global information update management-control device may search for the update statuses of the global information implemented by the application servers.

Figure 9:
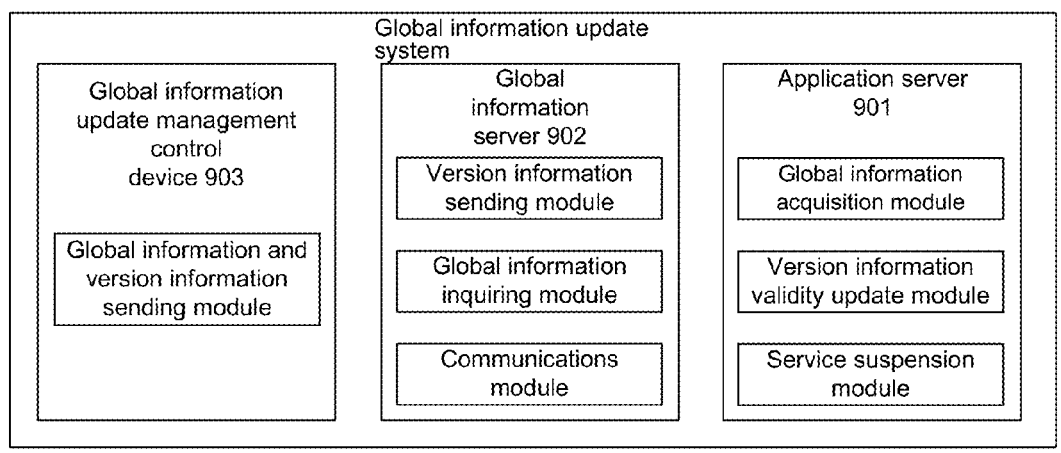
FIG. 9 is a diagram of a global information update system according to some embodiments of the disclosure.

FIG. 9 is a diagram of a global information update system according to some embodiments of the disclosure.

As illustrated in FIG. 9, the system includes an application server 901, a global information server 902 and a global information update management control device 903.

The application server 901 illustrated in FIG. 9 may include the following additional modules.

A global information acquisition module, configured for acquiring a current version information of global information from a global information server, updating the current version information in a local server, and acquiring corresponding global information from the global information server according to the acquired version information;

A version information validity update module, configured for updating a period of validity of the current version information according to a status of communication with the global information server;

A service suspension module, configured for suspending a service for the global information when detecting that the period of validity of the current version information has expired, so as to synchronize the global information of the various application servers.

The global information server 902 may include the following submodules.

A version information sending module, configured for acquiring global information and corresponding version information from a global information update management-control device, and sending the version information to the application servers;

A global information searching module, configured for receiving a global information acquisition request submitted by the application servers, searching for global information requested by the application servers in the global information corresponding to the version information carried in the global information acquisition request, and returning the global information to the application servers;

A communication module, configured for maintaining communications with the application servers so that the application servers can update the period of validity of the version information, and suspending the service for the global information when the period of validity has expired, so as to synchronize the global information of the various application servers.

The global information update management-control device 903 may include a global information and version information sending module, configured for sending the global information and the corresponding version information to the global information server.

In the global information update system in the embodiments of the disclosure, the application servers can immediately return an update confirmation notice after acquiring version information with a small amount of data, and acquire the corresponding global information from the global information servers according to the updated version information. The global information servers independently receive various versions of global information pushed by the global information update management control device. By way of decoupling the update process of the global information and the version information, although differences exist among network links, physical distances and other conditions, the differences in the time consumed by the application servers to acquire the version information are relatively small; therefore, the global version information can be updated within a short period of time.

According some embodiments, by updating the validity of the historical version information according to the communication statuses of the application servers and the global information servers, the service of the application servers is suspended in the condition of abnormal communication statuses, so that the problem that global data of the application servers is inconsistent, which is caused by network abnormities or "apparent death" of an update process or other causes, can be solved.

In addition, by confirming the communication statuses of the application servers and the global information servers, the global information update management control device can accurately acquire the global synchronous status information.

Figure 10:
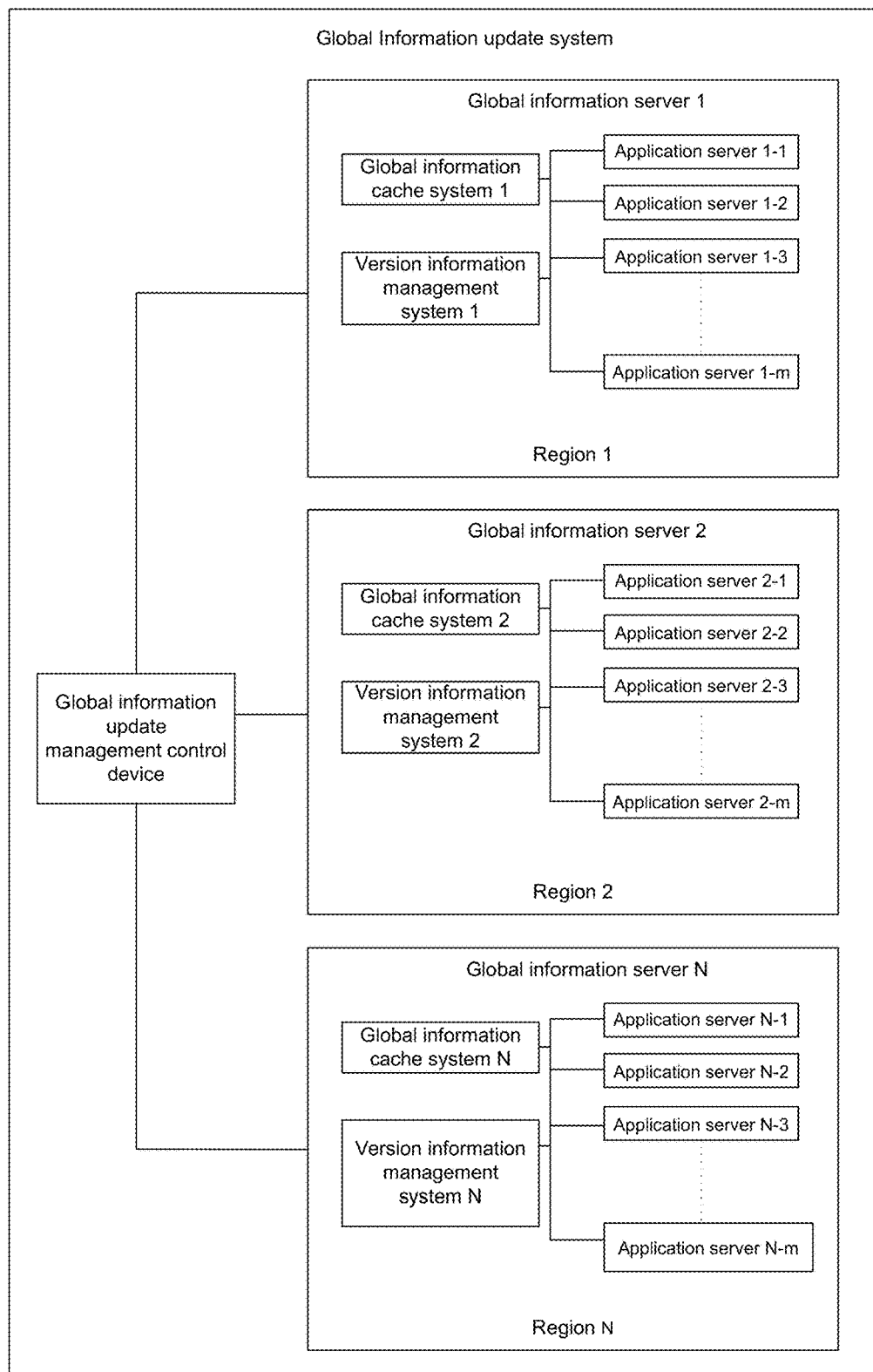
FIG. 10 is a diagram of a global information update system according to some embodiments of the disclosure.

FIG. 10 is a diagram of a global information update system according to some embodiments of the disclosure.

As illustrated in FIG. 10, the global information update system is provided with a global update management control device responsible for coordinating the update processes of the global information in multiple regions. Specifically, the global information update management control device actively pushes the updated global information and the corresponding version information to the global information servers in multiple regions, or correspondingly modifying the version information of the global information servers after pushing the updated global information to the global information servers in multiple regions.

The global information server can be deployed in the region of the application servers. The global information server can be separately provided with a global information cache system and a version information management system. The version information management system is capable of caching version information of various versions of global information pushed by the global information update management control device, or receiving the modifications of the version information saved by the global information update management control device. In addition, the version information management system is further responsible for coordinating the update processes of the version information of the global information of the various application servers in the region, so as to maintain the data consistency of the global information.

The application servers can be the application servers corresponding to various applications, can detect the new version information pushed to the global information server by the global information update management control device or the modifications of the version information from the version information management system of the global information server in the region by way of subscribing to new version information of the global information, and can acquire the new version information of the global information from the global information server.

The embodiments in this specification are described in a progressive manner. Each embodiment focuses on the differences it has from other embodiments. For the same or similar parts in the embodiments, references can be made to each other.

Those skilled in the art shall know that the embodiments of the disclosure can be provided as methods, devices or computer program products; therefore, the embodiments of the present invention may be in the form of a hardware-only embodiment, a software-only embodiment, or an embodiment of a combination of hardware and software. Moreover, the embodiments of the disclosure can be implemented in a form of a computer program product capable of being implemented on available computer memory media (including, but not limited to, disk memory, CD-ROM, optical memory, etc.) containing one or more available computer program codes.

In a typical configuration, the computer equipment comprises one or more processors (CPU), input/output interfaces, a network interface and a memory. The memory may include a volatile memory, a random access memory (RAM) and/or a non-volatile memory of computer readable media, such as a read-only memory (ROM) or a flash memory (RAM). The memory is an example of the computer readable media. The computer readable media include non-volatile and volatile, removable and non-removable media. Information can be saved in any way or by any technology. Information can be computer readable instructions, data structures, and modules of the programs or other data. The memory media of the computer may comprise but is not limited to phase-change random access memory (PRAM), static random access memory (SRAM), dynamic random access memory (DRAM), other types of random access memories (RAM), read-only memory (ROM), electrically erasable programmable read-only memory (EEPROM), flash memory or other memory technologies, compact disk-read only memory (CD-ROM), digital versatile disc (DVD) or other optical memories, cassette tape, tape and disk memory or other magnetic memories or any other non-transport media. The memory media can be used for saving the information accessible by the computer. According to the definition herein, the computer readable medium does not include non-durable computer readable transitory media, such as modulated data signals and carrier waves.

The embodiments of the disclosure are described according to the flow diagram and/or block diagrams of methods, terminals (systems) and computer program products. It is understood that computer program instructions can implement each flow and/or block in the flow diagram and/or block diagram, or combinations of the flows and/or blocks in the flow diagram and/or block diagram. The computer program instructions can be loaded on general-purpose computers, special-purpose computers, embedded processors or processors of other programmable data processing terminals to generator a machine, so that the instructions implemented by the computers or the processors of the other programmable data processing terminals can generate devices that can achieve the functions specified in a flow or multiple flows in the flow diagram and/or a block or multiple blocks in the block diagram.

The computer program instructions can also be saved on the computer readable memories that can cause computers or other programmable data processing terminals to work in special manners, so that the instructions saved on the computer readable memories can generate products comprising instruction devices, the instruction devices can achieve the functions specified in a flow or multiple flows in the flow diagram and/or a block or multiple blocks in the block diagram.

The computer program instructions can also be loaded on computers or other programmable data processing terminals, so that a series of operations can be carried in the computers or other programmable data processing terminals so as to generate the process implemented by the computers; thus the instructions implemented on the computers or other programmable data processing terminals can be used in the steps of achieving the functions specified in a flow or multiple flows in the flow diagram and/or a block or multiple blocks in the block diagram.

Although the preferable examples of the embodiments of the disclosure have already been described, those skilled in the art can change or modify the embodiments once they know the basic creative concepts. Therefore, the appended claims intend to explain the preferable embodiments and all changes and modifications within the range of the embodiments of the disclosure.

Finally, It should be noted herein, the first, the second and other relational terms are used for distinguishing an entity or an operation from the other entities and operations only, and not necessarily to require or imply any actual relationship or sequence between the entities or the operations; and the terms, such as "comprise", "comprising" or any other variant, are intended to cover a non-exclusive comprising, so that processes, methods, goods or terminal devices containing a series of factors not only include the factors, but also include other factors which are not expressly listed, or include the inherent factors of the processes, the methods, the goods or the terminal devices. In the absence of more limitations, the factors limited by a sentence of "comprising a" do not exclude the fact that the processes, the methods, the goods or the terminal devices containing the factors have other same factors.

The aforementioned application introduces a method and a device for acquiring global information, and a method and a device for processing global information in detail. Herein, the principles and implementation methods of the disclosure are elaborated with specific examples, and the description of the embodiments are only used for helping people understand the methods of the disclosure and the core ideas thereof; at the same time, for those skilled in the art, the specific implementation methods and application range can be changed according to the idea of the disclosure. In conclusion, the content of the description shall not be regarded as limitation to the disclosure.

What is claimed is:

1. A method comprising:
   providing, by a server, a network service using first global information, the first global information shared among the server and at least one additional server;
   retrieving, by the server, current version information associated with current global information and associated with a network service from a global information server, the current global information comprising a current version of the first global information;
   retrieving, by the server, the current global information associated with the network service from the global information server based on the current version information;
   updating, by the server, a period of validity of the current version information based on a status of a session communication channel established with the global information server; and
   suspending, by the server, the network service associated with the current global information when detecting that the period of validity of the current version information has expired.

2. The method of claim 1, wherein updating the period of validity of the current version information based on a status of the session communication channel established with the global information server comprises:
   sending, by the server, confirmation information of a first communication status to the global information server; and
   resetting, by the server, the period of validity of the current version information when receiving confirmation information of a second communication status returned by the global information server within a preset time period.

3. The method of claim 2, wherein detecting that the period of validity of the current version information has expired further comprises:
   determining, by the server, that the validity of the current version information has expired upon detecting that the confirmation information of the second communication status is not received within the preset time period.

4. The method of claim 3, wherein prior to updating the period of validity of the current version information based on a status of a session communication channel established with the global information server, the method further comprises:
   registering, by the server, a monitoring session of a communication status with the global information server;
   timing, by the server, the period of validity of the current version information after a successful registration;
   re-registering, by the server, the monitoring session of the communication status to the global information server; and
   determining, by the server, that the period of validity of the current version information is expired if the re-registering fails.

5. The method of claim 1 further comprising determining, by the server, whether the current global information carries a stop-write identification and, if so, suspending the network service associated with the current global information, and if not, providing the network service associated with the current global information.

6. The method of claim 1, further comprising transmitting, by the server, an update confirmation notice to the global information server after retrieving the current version information from a global information server.

7. The method of claim 1, wherein prior to retrieving the current version information from a global information server, the method further comprises subscribing, by the server, to the current version information at the global information server.

8. The method of claim 1, wherein the current global information comprises route data indicating a back-end application server associated with the network service.

9. The method of claim 8 wherein suspending the network service comprises suspending an operation executed by the back-end server and requested by a user.

10. An apparatus comprising:
    a processor; and
    a non-transitory memory storing computer-executable instructions therein that, when executed by the processor, cause the apparatus to:
       provide a network service using first global information, the first global information shared among the server and at least one additional server;
       retrieve current version information associated with current global information and associated with a network service from a global information server, the current global information comprising a current version of the first global information;
       retrieve the current global information associated with the network service from the global information server based on the current version information;
       update a period of validity of the current version information based on a status of a session communication channel established with the global information server; and
       suspend the network service associated with the current global information when detecting that the period of validity of the current version information has expired.

11. The apparatus of claim 10, wherein the instructions causing the apparatus to update the period of validity of the current version information based on a status of a session communication channel established with the global information server further include instructions causing the apparatus to:
    send confirmation information of a first communication status to the global information server; and
    reset the period of validity of the current version information when receiving confirmation information of a second communication status returned by the global information server within a preset time period.

12. The apparatus of claim 11, wherein the instructions causing the apparatus to detect that the period of validity of the current version information has expired further include instructions causing the apparatus to:
    determine that the validity of the current version information has expired upon detecting that the confirmation information of the second communication status is not received within the preset time period.

13. The apparatus of claim 12, wherein prior to the instructions causing the apparatus to update the period of validity of the current version information based on a status of a session communication channel established with the global information server, the instructions further cause the apparatus to:
  register a monitoring session of a communication status with the global information server;
  time the period of validity of the current version information after a successful registration;
  re-register the monitoring session of the communication status to the global information server; and
  determine that the period of validity of the current version information is expired if the re-registering fails.

14. The apparatus of claim 10, wherein the instructions further cause the apparatus to determine whether the current global information carries a stop-write identification and, if so, suspending the network service associated with the current global information, and if not, providing the network service associated with the current global information.

15. The apparatus of claim 10, further including instructions causing the apparatus to transmit an update confirmation notice to the global information server after retrieving the current version information from a global information server.

16. The apparatus of claim 10, wherein prior to the instructions causing the apparatus to retrieve current version information from a global information server, the instructions further cause the apparatus to subscribe to the current version information at the global information server.

17. The apparatus of claim 10, wherein the current global information comprises route data indicating a back-end application server associated with the network service.

18. The apparatus of claim 17 wherein the instructions causing the apparatus to suspend the network service include instructions causing the apparatus to suspend an operation executed by the back-end server and requested by a user.

19. A system comprising:
  a global information server used for storing current version information and current global information;
  a global information update management control device used for transmitting current version information and current global information to the global information server; and
  an application server used for:
    providing a network service using first global information, the first global information shared among the server and at least one additional server;
    retrieving the current version information associated with the current global information and associated with a network service from the global information server, the current global information comprising a current version of the first global information;
    retrieving the current global information associated with the network service from the global information server based on the current version information;
    updating a period of validity of the current version information based on a status of a session communication channel established with the global information server; and
    suspending the network service associated with the current global information when detecting that the period of validity of the current version information has expired.

20. The system of claim 19 wherein the application server is further used for:
  sending confirmation information of a first communication status to the global information server; and
  resetting the period of validity of the current version information when receiving confirmation information of a second communication status returned by the global information server within a preset time period.

* * * * *